United States Patent [19]

Warner

[11] 4,352,304
[45] Oct. 5, 1982

[54] VISCOUS DAMPING OF STEERING SHAFT
[75] Inventor: Laurence A. Warner, Saginaw, Mich.
[73] Assignee: General Motors Corporation, Detroit, Mich.
[21] Appl. No.: 207,439
[22] Filed: Nov. 17, 1980
[51] Int. Cl.[3] .......................... B62D 1/20; B62D 3/12; F16D 57/00
[52] U.S. Cl. ..................................... 74/498; 188/290; 280/90
[58] Field of Search .................. 74/422, 498; 188/290; 280/90

[56] References Cited
U.S. PATENT DOCUMENTS

| 927,735 | 7/1909 | Lemp | 280/90 |
|---|---|---|---|
| 1,276,121 | 8/1918 | Saxton | 280/90 |
| 1,928,816 | 10/1933 | Grayson | 280/90 |
| 2,661,915 | 12/1953 | O'Connor | 280/90 X |
| 2,838,125 | 6/1958 | Staude | 280/90 X |
| 3,084,566 | 4/1963 | Pistillo | 280/90 X |
| 3,593,592 | 7/1971 | Adams | 74/498 |
| 3,779,575 | 12/1973 | Mazur | 280/90 X |

FOREIGN PATENT DOCUMENTS 1566357 4/1980 United Kingdom .

Primary Examiner—Allan D. Herrmann
Attorney, Agent, or Firm—Charles R. White

[57] ABSTRACT

Viscous damper for steering gear assembly between the steering shaft and gear incorporating a fixed outer cylinder having a plurality of concentric walls which are interposed between concentric walls of a rotatable inner cylinder. The spaces between the relatively rotatable walls are filled with a viscous fluid which is sheared to control any free steering gear oscillatory motion.

3 Claims, 3 Drawing Figures

VISCOUS DAMPING OF STEERING SHAFT

This invention relates to vehicle steering and more particularly to a new and improved steering assembly incorporating a viscous steering damper interposed between the steering wheel and the steering gear.

Some front wheel drive vehicles with manual steering assemblies have exhibited diversion free control which may be objectionable to some vehicle operators. This control is a condition which might occur in the steering as it returns without manual restraint from cornering under full acceleration of the vehicle where the steering system continues to oscillate rapidly from side to side about the center of travel. Prior to the present invention, shock absorber or damper units have been utilized on the output side of the rack and pinion steering assembly. While this prior shock damper construction has substantially eliminated divergent free control oscillation, it is a bulky and somewhat expensive add-on device. The present invention, in contrast to the prior art shock dampers, is a highly compact damper which is attached to and in parallel with the lower end of the steering column in a compact package which does not require any substantial space and can be readily installed on the pinion gear assembly of a rack and pinion steering gear.

In the preferred embodiment of this invention, the viscous damper is incorporated into the rack and pinion steering gear assembly in order to reduce its size and cost. The viscous damper consists of a series of stationary annular surfaces spaced from and in between a series of rotating annular surfaces. The stationary surfaces are part of an outer cylinder which attaches to the rack and pinion steering assembly housing. The rotating surfaces are part of an inner cylinder nested in the outer cylinder and fixed to the pinion shaft to rotate with that shaft. The clearances between the stationary and rotating surfaces is filled with a viscous silicone fluid so that effective viscous damping is developed as the viscous fluid is sheared at the boundary layer on relative movement of the surfaces. The fluid shear causes a resisted torque on the pinion shaft which increases nonuniformly with the speed of the pinion shaft. With this invention there is highly effective and efficient damping out of divergent free control oscillation. The damper is of a reduced cost as compared with the shock damper and can be contained in the same space as a conventional power rack and pinion steering assembly. The damper will control wheel vibrations and will not substantially vary with usage because the relatively rotating surfaces do not contract with either. The viscous damper has no exposed moving parts and is highly compact to eliminate any underhood interference.

In the drawings

Figure 1:
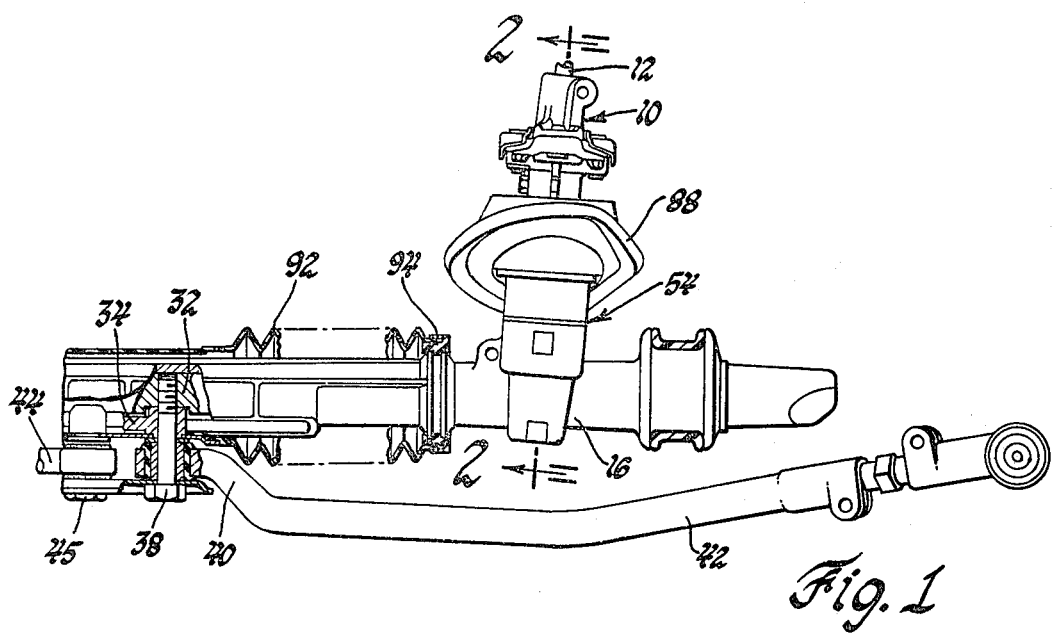
FIG. 1 is a portion of a front elevational view with parts cut away of a manual rack and pinion steering gear assembly.
Figure 2:
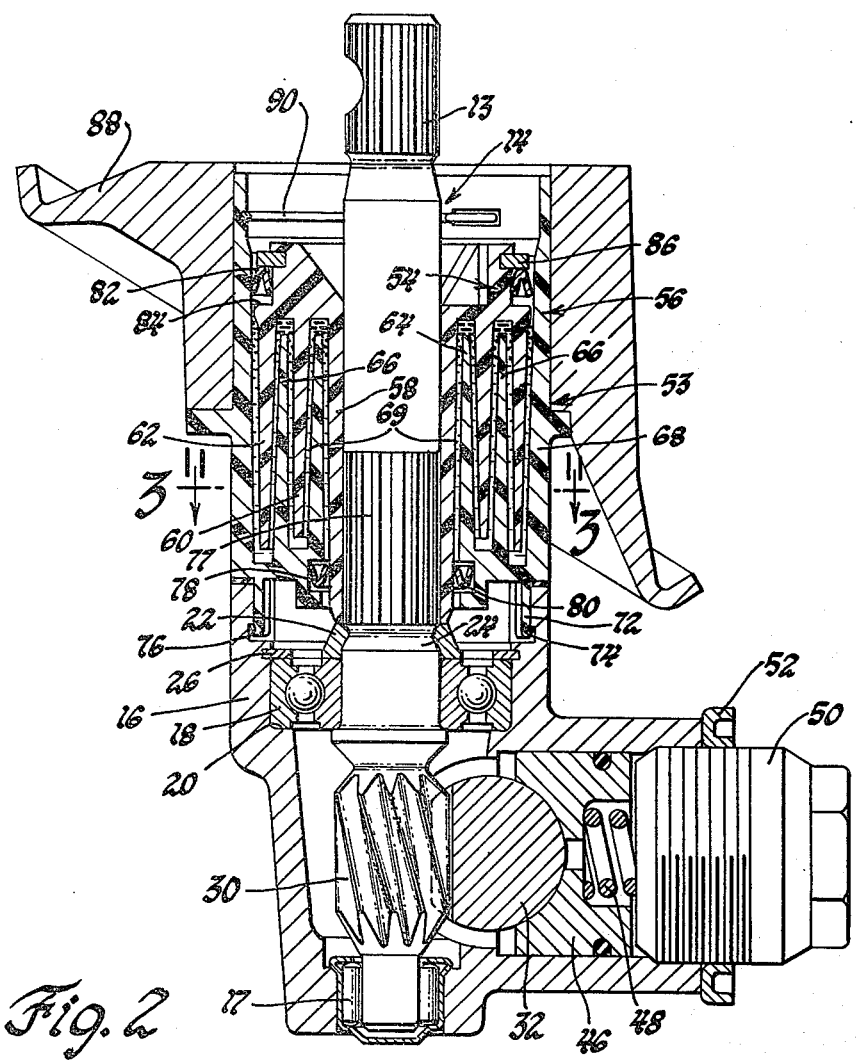
FIG. 2 is a cross-sectional view taken along line 2—2 as viewed in the direction of the indicator arrows.
Figure 3:
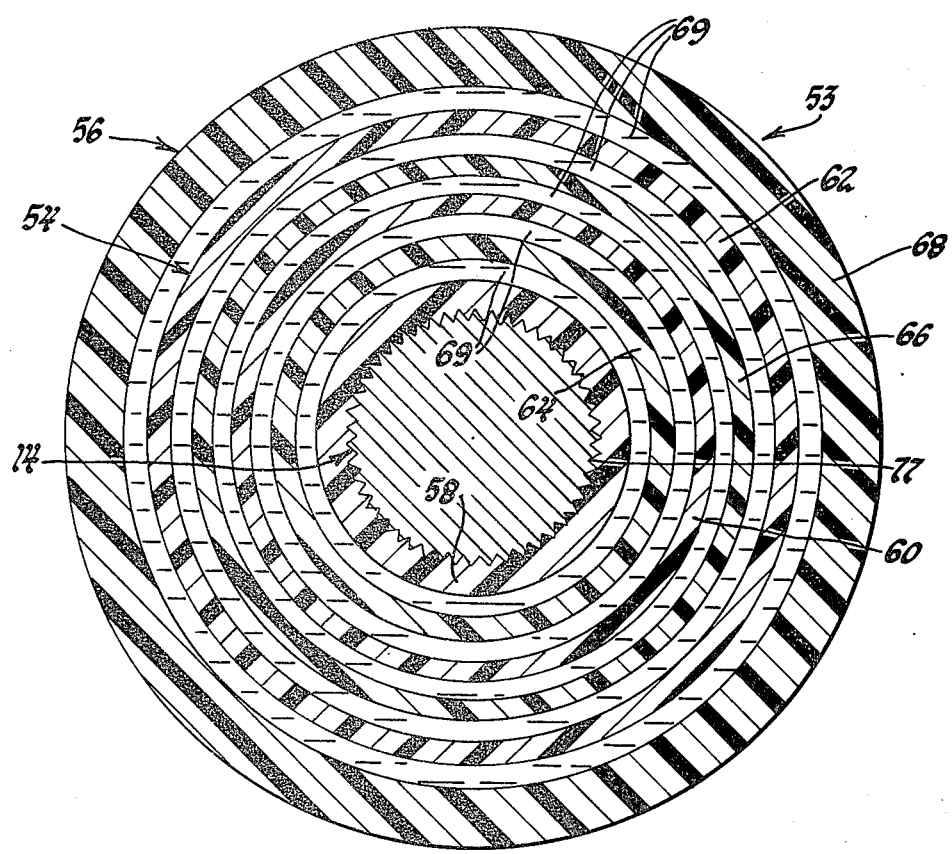
FIG. 3 is a cross-sectional view taken along line 3—3 of FIG. 2 as viewed in the direction of the indicator arrows.

Turning now in greater detail to FIGS. 1 and 2, there is shown a coupling assembly 10 drivingly connecting a lower end of a manually rotatable steering shaft 12 to the upper end 13 of an elongated steering gear input shaft 14. The steering gear input shaft 14 is rotatably mounted in a housing 16 by a lower bearing 17 and by an upper bearing 18 which is supported on an internal shoulder 20 formed in the housing. A collar 22 seated on the inner face of bearing 18 is rolled or otherwise deformed into an annular groove 24 in the shaft 14 so that the input shaft and bearing form an assembly. This assembly is retained in the housing 16 by a snap ring 26. The shaft 14 terminates in a pinion gear 30 whose teeth mesh with the teeth of an elongated rack 32 mounted for lateral sliding movement within the housing being guided therein by rack guides 34. Secured to rack 32 by bolt 38 is the inboard end 40 of a left-hand tie rod assembly 42 operatively connected to the steering knuckle of the left side dirigible road wheel assembly not illustrated. In addition to the left-hand tie rod assembly 42, there is a right-hand tie rod assembly 44 operatively connected by tie rod bolt 45 to the rack 32 and the right side dirigible road wheel.

With this arrangement, rotational input of the steering shaft 12 turns pinion 30 so that rack 32 is accordingly laterally moved within housing 16 for steering the dirigible wheels of the vehicle. The rack 32 is yieldably urged into engagement with the pinion by a rack bearing 46 and helical spring 48 position between the bearing and an adjuster plug 50 threaded into the housing as shown in FIG. 2. An adjustable lock nut 52 is threaded on the adjuster plug and tightened against the housing after the plug has been firmly seated to secure the plug in its seated position.

To provide for control of steering system oscillation such as might occur from manually unrestrained returns from cornering under full acceleration of the vehicle or from road wheel vibrations or other causes which might be transmitted through the tie rods and the steering gear to the steering wheel, a special viscous damper assembly 53 is provided. This damper assembly comprises a pair of relatively rotatable nested cylinders 54 and 56 of nylon or other suitable plastic material. Cylinder 54, an inner rotatable cylinder, has a plurality of concentric annular walls 58, 60, and 62 interfaced with concentric annular walls 64, 66, and 68 of outer stationary cylinder 56 and spaced therefrom so that viscous shear zones 69 are formed therebetween into which a highly viscous silicone fluid is injected through a suitable opening not illustrated. Outer wall 68 of cylinder 56 provides the outer shell of the damper assembly 53. The lower end of cylinder 56 is formed with a plurality of resilient tangs or tabs 72 each of which has an outwardly extending radial tooth 74 that engages the underside of an annular shoulder 76 of the housing on axial installation of the damper assembly into housing 16 so that the outer cylinder is securely retained in its installed position. The inner cylinder 54 has its innermost wall 58 press fitted onto shaft 14 and into engagement with the splines 77 of this shaft so that the inner cylinder turns with shaft 14 with respect to the stationary outer cylinder.

A lower seal 78 disposed in an annular pocket 80 in the stationary cylinder sealingly engages the outer circumference of the inner wall 64 of the rotatable cylinder 54 to block the escape of silicone fluid from the shear zones. An upper seal 82 is held in sealing position between the inner and outer cylinders in the offset 84 in the inner cylinder by retainer ring 86 to prevent the escape of the viscous fluid from the upper end of the viscous damper assembly.

The bulky and outwardly flanged annular seal 88 is a dash seal retained on the outer cylinder 56 by a spring retainer 90 to seal the passage of the steering shaft assembly through the forward bulkhead of the vehicle body not shown. The steering gear assembly incorporates a conventional, flexible boot construction 92 retained on the housing by a clamping ring 94 to provide sealing of the rack and housing 16. With this damper assembly there is a highly compact viscous damper unit integral with the steering gear assembly which can be contained in the same space as a conventional power rack and pinion steering gear assembly. In addition to being a highly compacted space saving unit, the damping will not appreciably vary with usage because the surfaces do not contact each other and there is no mechanical wear when the components are relatively rotated. This viscous damper has no exposed moving parts thereby eliminating any underhood interferences and operates smoothly and with uniform resistance over the entire travel of the steering assembly. With this invention, the degree of damping may be readily varied by increasing the shear area and/or by varying the viscosity of the shear fluid. This feature provides improved fine tuning so that the damper may be employed in a wide range of applications.

While a preferred embodiment has been shown and described to illustrate the invention, other embodiments will become apparent to those skilled in the art. Accordingly, the scope of this invention is set forth in the following claims.

The embodiments of the invention in which an exclusive property or privilege is claimed are defined as follows:

1. A steering gear for a vehicle having a manual steering shaft and a pair of output members steerably moved in response to manual turning inputs to said steering shaft comprising input gear means operatively connected to said steering shaft, output gear means meshing with said input gear means and drivingly connected to said output members, said input gear means having an elongated shaft operatively connected thereto for rotation with said steering shaft, a housing for said input and output gear means, first viscous damper means secured to said housing and disposed around a portion of said elongated shaft of said input gear means, second viscous damper means secured to said elongated shaft and nested within said first viscous damper means, said first and second damper means having relatively movable wall means spaced from one another to form a viscous fluid shear area therebetween, and a viscous fluid in said shear area for damping oscillatory input motion transmitted from said output members of said steering gear which causes the oscillating relative movement of said first and second wall means resulting in the viscous shear of said fluid in said shear area.

2. A steering gear for a vehicle having a manual steering shaft and a pair of output members steerably moved in response to manual turning inputs to said steering shaft comprising a pinion gear assembly operatively connected to said steering shaft, rack gear means meshing with said pinion gear assembly means and drivingly connected to said output members, said pinion gear assembly means having an elongated drive shaft operatively connected thereto drivingly connected to said steering shaft for turning movement therewith, a housing for said rack gear means and for said pinion gear assembly disposed in part around a lower portion of said elongated drive shaft, first viscous damper means secured to said housing and disposed around an upper portion of said elongated drive shaft, second viscous damper means secured directly to said elongated drive shaft for rotation therewith and disposed within said first viscous damper means, said first and second damper means having annular wall means spaced from one another to form a viscous fluid shear area therebetween, and a viscous fluid in said shear area for damping vibratory motion experienced in said steering gear that causes the relative movement of said first and second wall means and the viscous shear of said fluid in said shear area.

3. A steering gear for a vehicle having a manual steering shaft and a pair of output members steerably moved in response to manual turning inputs to said steering shaft comprising pinion gear means operatively connected to said steering shaft, rack gear means meshing with said pinion gear means and drivingly connected to said output members, said pinion gear means having an elongated shaft operatively connected thereto and to said steering shaft for rotation with said steering shaft, a housing disposed outwardly of and around a portion of said elongated shaft, first cylindrical viscous damper means, fastener means securing a lower portion of said damper means to a portion of said housing, said first damper means being disposed around a portion of said elongated shaft, second cylindrical viscous damper means secured directly to said elongated shaft and disposed within said first damper means, said first and second damper means having relatively movable cylindrical wall means spaced from one another to form a viscous fluid shear area therebetween, and a viscous fluid in said shear area for damping any vibrations which causes the relative movement of said first and second cylindrical wall means and the accompanying viscous shear of said fluid in said shear area.

* * * * *